No. 802,072. PATENTED OCT. 17, 1905.
A. R. BEHNKE.
LUBRICATOR.
APPLICATION FILED APR. 27, 1905.
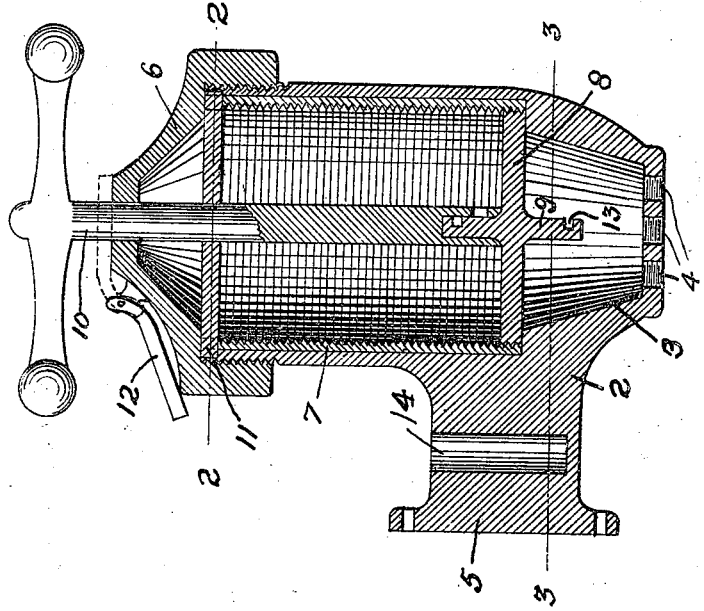
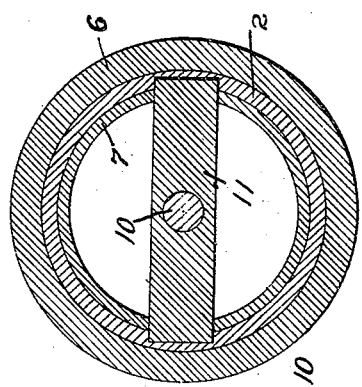
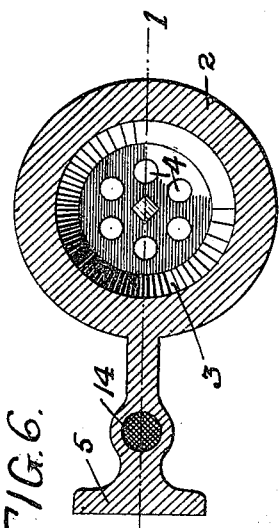
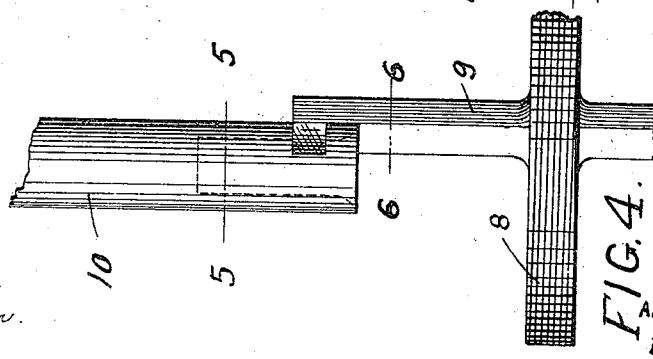
WITNESSES
C. F. Snow
C. G. Hanson
INVENTOR.
ALBERT R. BEHNKE
By Paul & Paul
HIS ATTORNEYS

UNITED STATES PATENT OFFICE.

ALBERT R. BEHNKE, OF ST. PAUL, MINNESOTA.

LUBRICATOR.

No. 802,072.  Specification of Letters Patent.  Patented Oct. 17, 1905.

Application filed April 27, 1905. Serial No. 257,566.

*To all whom it may concern:*

Be it known that I, ALBERT R. BEHNKE, of St. Paul, in the county of Ramsey, State of Minnesota, have invented certain new and useful Improvements in Lubricators, of which the following is a specification.

This invention relates to improvements in lubricators, and especially to the form of lubricator generally known as a "grease-cup."

The invention consists generally in a grease-cup having a removable inner shell internally screw-threaded with a screw-threaded plunger fitting therein.

The invention consists, further, in the constructions and combinations hereinafter described, and particularly pointed out in the claims.

In the accompanying drawings, forming part of this specification, Figure 1 is a vertical section of a grease-cup embodying my invention, taken on line 1 1 of Fig. 3. Fig. 2 is a horizontal section on line 2 2 of Fig. 1. Fig. 3 is a horizontal section on line 3 3 of Fig. 1. Fig. 4 is a detail showing the means for removing the inner shell and plunger from the outer shell. Fig. 5 is a detail section on line 5 5 of Fig. 4. Fig. 6 is a detail section on line 6 6 of Fig. 4.

In the drawings, 2 represents the outer shell, which may be of any suitable size and construction. It is provided at its lower end with the conical bottom 3 and with a series of preferably screw-threaded holes 4. To these holes pipes or tubes leading to the different bearings to be lubricated may be connected. If preferred, a single hole or discharge-opening may be employed. The shell 2 is preferably formed with a bracket 5, by means of which it may be secured to a suitable support, although I do not confine myself to the use of any particular form of bracket or any means for securing the shell in position. The shell is preferably screw-threaded exteriorly at its upper end and a screw-threaded cover 6 is fitted to said shell. Arranged within the outer shell 2 is the removable inner shell 7. This shell fits within the outer shell and is provided with a screw-threaded wall. A plunger 8, having a screw-threaded edge, is arranged within the shell 7 and is adapted to be screwed back and forth therein. This plunger has a short stem 9, preferably of rectangular form, projecting from each side thereof, preferably at the center of the plunger.

A wrench or operating-handle 10 extends through a central opening in the cover 6 and is provided at its lower end with a socket adapted to engage the stem 9 on the upper surface of the plunger. By this means the plunger may be turned and screwed down in the shell. The upper edges of both of the shells 2 and 7 are provided with recesses adapted to receive a cross-bar 11, which is held in position by the cover 6. This cross-bar is provided with a central opening, through which the wrench 10 extends. The recesses are formed in both edges of the inner shell, as that shell may be used with either end uppermost. When the cross-bar is in position and the cover is screwed down onto the shell, the inner shell is prevented from turning with the plunger 8. The cover 6 is preferably provided with a hinged plate 12, adapted to be turned over the opening for the wrench in the cover 6. (See Fig. 1.) Each of the stems 9 is preferably provided with a recess 13 near its end, and the wrench 10 is provided with a slot also near its end, so that when it is desired to remove the inner shell from the outer shell the cover 6 may be unscrewed, the cross-bar 11 taken off, and then the end of the wrench can be hooked onto the stem 9 (see Fig. 4) and the plunger and the inner shell may be lifted out of the outer shell. The bracket 5 is preferably provided with a socket 14, in which the wrench is placed when not in use.

In operating the device the shell 7 is removed from the outer shell and is filled with the lubricating material. It is then inverted and put into position in the outer shell. The cross-bar 11 is then put in place, the cover 6 screwed down, and when it is desired to force the lubricating material through the tubes connected to the outer shell the wrench is inserted through the hole in the top of the cover and through the hole in the cross-bar and the socket in its lower end is engaged with the stem 9 on the plunger. By turning the wrench the plunger is screwed down in the inner shell and the lubricating material is forced out of the hole or holes in the bottom of the outer shell. When the plunger has been moved to the lower end of the inner shell, the cover 6 is removed, the cross-bar 11 taken out, and the inner shell and plunger are then removed from the outer shell. The inner shell is then filled with lubricating material and inserted in a reversed position in the outer shell. This brings the plunger 8 to the top of the shell with the other stem 9 uppermost. The cross-bar 11 is put in position and the cap 6 is screwed down on the top of the outer shell and the device is ready for use. The wrench may be left in this position or it may be removed and placed in the socket 14, and the hole in the cover may be closed by the hinged plate 12.

I claim as my invention—

1. In a device of the class described, the combination, with an outer shell, of a removable and reversible inner shell, means for securing said inner shell within the outer shell, a plunger arranged to move from the top to the bottom of said inner shell and return to its starting-point when said shell is reversed, and means for moving said plunger.

2. The combination, in a device of the class described, with an outer shell, provided with a suitable discharge opening or openings, of a removable and reversible inner shell, having a screw-threaded inner wall, a screw-threaded plunger arranged to move from the top to the bottom of said inner shell and return to its starting-point when said shell is reversed, and means for engaging and turning said plunger, substantially as described.

3. The combination, with the outer shell provided with a conical bottom and with a suitable discharge opening or openings, of a removable and reversible inner shell having a screw-threaded inner wall and a screw-threaded plunger arranged therein, provided upon both surfaces with suitable means by which said plunger may be turned.

4. The combination, with the outer shell provided with a conical bottom and with suitable discharge opening or openings, and a suitable bracket by which said shell is supported, of a removable and reversible inner shell having a screw-threaded inner wall, a screw-threaded plunger arranged to move from the top to the bottom of said inner shell and return to its starting-point when said shell is reversed, means for preventing said inner shell from turning, means for turning said plunger, and a cover arranged upon said outer shell, substantially as described.

5. The combination, with the outer shell, of the removable inner shell and plunger arranged within said inner shell having the stems 9 provided with the recesses 13.

6. The combination, with an outer shell, of an inner removable and reversible shell having its walls interiorly threaded from end to end, a threaded plunger fitting within said inner shell and arranged to move from the top to the bottom of said shell and return to its starting-point when said shell is reversed, a cap covering said shells, and means for operating said plunger when said inner shell is in its normal position or reversed, substantially as described.

7. In a device of the class described, the combination, with an outer shell, of an inner shell open at each end and removable and reversible and having its inner walls threaded from end to end, a plunger threaded to fit said shell, a cap for said shells, a wrench device, and means provided on the upper and under side of said plunger to engage said wrench, substantially as described.

8. The combination, with an outer shell, of an inner removable and reversible shell, said outer shell having recesses in its upper end and said inner shell having recesses in both ends, a cross-bar fitting within said recesses, a plunger within said inner shell, means for operating said plunger, and a cap covering said shells.

In witness whereof I have hereunto set my hand this 27th day of March, 1905.

ALBERT R. BEHNKE.

Witnesses:
  C. G. HANSON,
  C. MACNAMARA.